Dec. 30, 1941.  E. F. NELSON  2,268,416
WELDING ORGANIZATION
Filed April 1, 1940

INVENTOR
Edward F. Nelson
BY Harry C. Schroeder
ATTORNEY

Patented Dec. 30, 1941

2,268,416

UNITED STATES PATENT OFFICE 2,268,416

WELDING ORGANIZATION

Edward F. Nelson, Vallejo, Calif.

Application April 1, 1940, Serial No. 327,240

2 Claims. (Cl. 85—37)

REISSUED DEC 21 1943

This invention relates to the electric butt-welding of stud-like members to surfaces of metallic objects.

In attaching a stud or other rod-like member to the surface of a metal object, it is the most accepted practice to connect the metal object and the stud in series relation in an electric welding circuit, create an electric arc discharge between an end of the stud and an area of the metal object, to which the stud is to be attached, bring both the end of the stud and the said area of the metal object to proper fusion temperature, and then bring the molten portions of the stud and object together so that they are bonded together.

Some metals will readily unite and form a desirably strong bond when welded in this manner while others require the use of a flux which must be introduced or previously placed between the surfaces to be joined so that the proper weld may be obtained. This flux, which is usually a powdered mineral substance, is generally placed in a small pile, on and coincident with the area of the metal object to which the end of the stud is to be welded. The stud is then placed directly above the flux and the welding arc is created, the flux being thus within the arc flame. However, this procedure may be employed only when the surface of the metal object is so nearly horizontal that the pile of powdered flux material will remain intact. It is, of course, obvious that when a stud is to be welded to a vertical surface this method of fluxing would be impractical. There is also another undesirable feature inherent in the method of fluxing just described and that is should there be any spattering of the molten metal during the time that the arc is burning, possibly an excessive amount of the fluxing material may be blown from the arc gap so that the resulting weld is seriously weakened. The invention, which will now be described in detail, has as its objects the provision of means, associated with the stud to be welded either to a horizontal or vertical surface, for maintaining, during the welding operation, a quantity of flux in proper relation to the electrodes between which the arc flame is burning, and the further provision of shielding means for preventing spattering of the molten metal of the weld when the stud is plunged against the surface of the object to which it is being welded.

Figure 1:
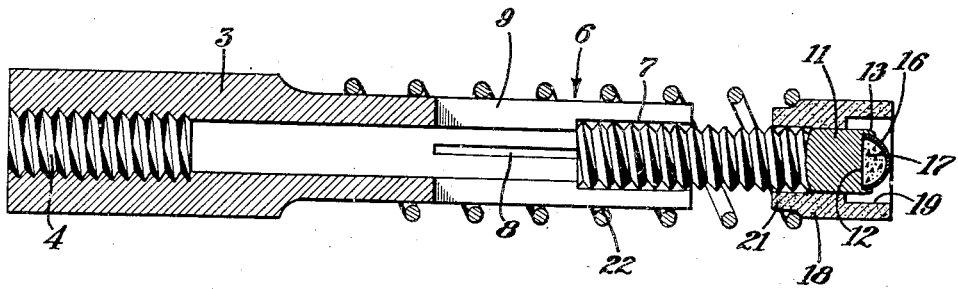
Figure 1 is longitudinal vertical sectional view, partly in side elevation, showing the improved stud and shield of my invention mounted on the chuck of an electric welder.

In detail, I have shown a chuck, such as forms part of a stud welding apparatus of the type disclosed in my prior application, Serial No. 233,872, filed October 7, 1938, comprising a body 3 having at one end a threaded recess 4 which is engageable with the movable ram of the device of my abovementioned prior application, or with other means by which the chuck may be moved toward and from the surface of a metallic object. The other end of the body 3 is provided with an integral sleeve 6 which is provided with a concentric recess 7 and with axially extending saw slots 8 which divide the sleeve into a plurality of resiliently flexible fingers 9. The stud 11, which is to be butt welded to the surface of a metallic object, not shown, has one end thereof inserted in the recess 7 and is frictionally retained therein by the radial pressure of the fingers 9. The other end of the stud, between which and the surface of the metallic object the electric arc is struck, is provided with a counterbored recess 12 having a peripheral bead 13. A hemispherical hollow shell 16, of relatively thin metal, has its rim positioned within the recess 12 and the bead 13 is spun over so as to engage the shell and securely fasten the latter to the end of the stud. The shell 16 forms, in conjunction with the bottom surface of the recess 12, a hollow chamber in which fluxing material 17, such as silicon, a mixture of iron and aluminum filings, or other such substances, may be placed. The fluxing material will thus be maintained in correct relation to the end of the stud and the welding arc regardless of whether the stud is to be welded to a surface in axially vertical or horizontal positions.

Figure 2:
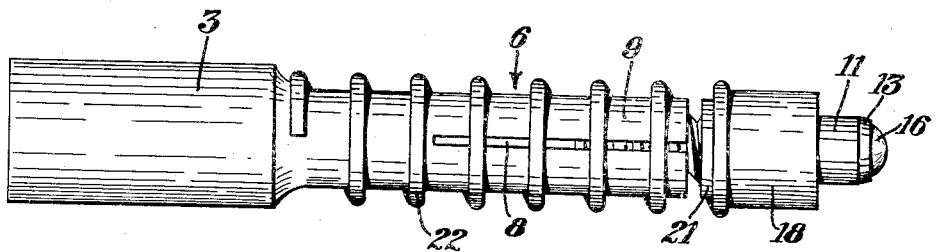
Figure 2 is a top plan view of the structure shown in Figure 1 showing the shield retracted to show the end of the stud.

Concentric with and slidable axially of the stud 11 is a ferrule 18, composed of lava, compressed fire clay or the like electrically non-conductive heat resistant material, having, in the end thereof coinciding with the end of the stud, a counterbore 19 and at the opposite end a grooved shoulder 21 to which one end of a coil spring 22 is secured. The spring 22 is a snug fit on the sleeve 6 although it may, by the exertion of manual pressure, be slid axially of the sleeve as shown in Figure 2 so as to fix the position of the ferrule 18 relative to the end of the stud. In its operative position, the end of the stud coincides with that of the ferrule as shown in Figure 1. The counterbore 19 thus forms a pocket or cup about the end of the stud. When the electrically charged stud and the surface of the metal object are brought into contact and then immediately separated, an electric arc will burn between the end of the stud and the adjacent area of the object surface. This will melt the shell 16, the fluxing material 17 and the metal at the end of the stud. It will be seen that the cup surrounding the end of the stud will prevent an appreciable amount of the molten material from falling out of the arc gap when the stud is being welded in an axially horizontal position. It will also be seen that when the molten end of the stud is thrust into the arc crater in the surface of the metal object, the ferrule 18, in being brought into engagement with the said surface slightly before the latter is engaged by the stud, forms an enclosure about the crater which limits radial spattering of the molten metal to the diameter of the counterbore 19. A majority of the metal is thus confined closely adjacent the junction of the stud with the object with the result that a weld of maximum strength is obtained. After the welding current has been turned off and the weld has solidified, the action of drawing the chuck body 3 axially of the stud away from the surface of the metal object, will pull the end of the stud out of engagement with the holding fingers 9 and through the bore of the ferrule 18, the latter remaining connected with the chuck body by means of the spring 22. A fresh stud may now be mounted in the chuck, the end of the ferrule 18 aligned with the end of the stud, and the welding operation proceeded with as has been described above.

Having thus described my invention in detail, what I claim as new and desire to secure by Letters Patent is:

1. A rod-like member having a recess in an end thereof, a quantity of weld-fluxing material in said recess, a thin shell in and closing said recess, and a portion of said rod-like member overlying said shell for holding the shell in said recess.

2. A rod-like member having a recess in an end thereof provided with a marginal bead, a quantity of weld-fluxing material in said recess, a thin metallic shell in and closing said recess, and said marginal bead being bent to a position overlying said shell for securing said shell in said recess.

EDWARD F. NELSON.